US012543287B2

(12) United States Patent
Heymann et al.

(10) Patent No.: US 12,543,287 B2
(45) Date of Patent: Feb. 3, 2026

(54) HIGH-CAPACITY SERVER MEMORY DEVICE IN A SINGLE UNIT FORM FACTOR

(71) Applicant: Intel Corporation, Santa Clara, CA (US)

(72) Inventors: Douglas Heymann, Portland, OR (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 17/898,323

(22) Filed: Aug. 29, 2022

(65) Prior Publication Data

US 2022/0418145 A1   Dec. 29, 2022

(51) Int. Cl.
*H05K 7/14*   (2006.01)

(52) U.S. Cl.
CPC ......... *H05K 7/1492* (2013.01); *H05K 7/1489* (2013.01)

(58) Field of Classification Search
CPC ... H05K 7/1487; H05K 7/1489; H05K 7/1492
See application file for complete search history.

(56) References Cited

U.S. PATENT DOCUMENTS

| | | | |
|---|---|---|---|
| 7,009,848 B2* | 3/2006 | Ruckerbauer | H05K 1/14 361/788 |
| 7,729,126 B2* | 6/2010 | Calhoun | H01R 27/00 361/801 |
| 8,566,556 B2 | 10/2013 | Rajan et al. | |
| 9,496,633 B1* | 11/2016 | Huang | H05K 7/1422 |
| 9,880,754 B2 | 1/2018 | Berke | |
| 10,888,010 B2 | 1/2021 | Geng et al. | |
| 2003/0011391 A1* | 1/2003 | Brunelle | H05K 7/1431 324/756.02 |
| 2004/0004822 A1* | 1/2004 | Ruckerbauer | H05K 1/14 361/785 |
| 2013/0103896 A1* | 4/2013 | Rajan | G11C 7/1045 711/105 |
| 2013/0155599 A1 | 6/2013 | Ross et al. | |
| 2014/0108692 A1* | 4/2014 | Doglio | H05K 7/1489 361/679.02 |
| 2015/0171535 A1* | 6/2015 | Li | H01R 12/721 439/78 |
| 2019/0303333 A1* | 10/2019 | Ding | G11C 5/04 |
| 2023/0005882 A1* | 1/2023 | Vergis | H01R 12/714 |

* cited by examiner

*Primary Examiner* — Adrian S Wilson
(74) *Attorney, Agent, or Firm* — Compass IP Law PC

(57) ABSTRACT

A server memory device provides highspeed storage to a computer system. The server memory device has a connector that can make electrical coupling with the computer system. The server memory device includes two memory modules, each with one or more memory chips. Each memory module is coupled and bonded with an interposer. Each interposer is coupled and bonded with the server memory device connector. The connector and interposers provide a high-density interconnect that connects two memory modules to a computer system. The server memory device has a form factor that uses a single unit (1 U) of a server rack, doubling the memory capacity provided to the computer system through a single unit (1 U) equipment rack.

20 Claims, 11 Drawing Sheets

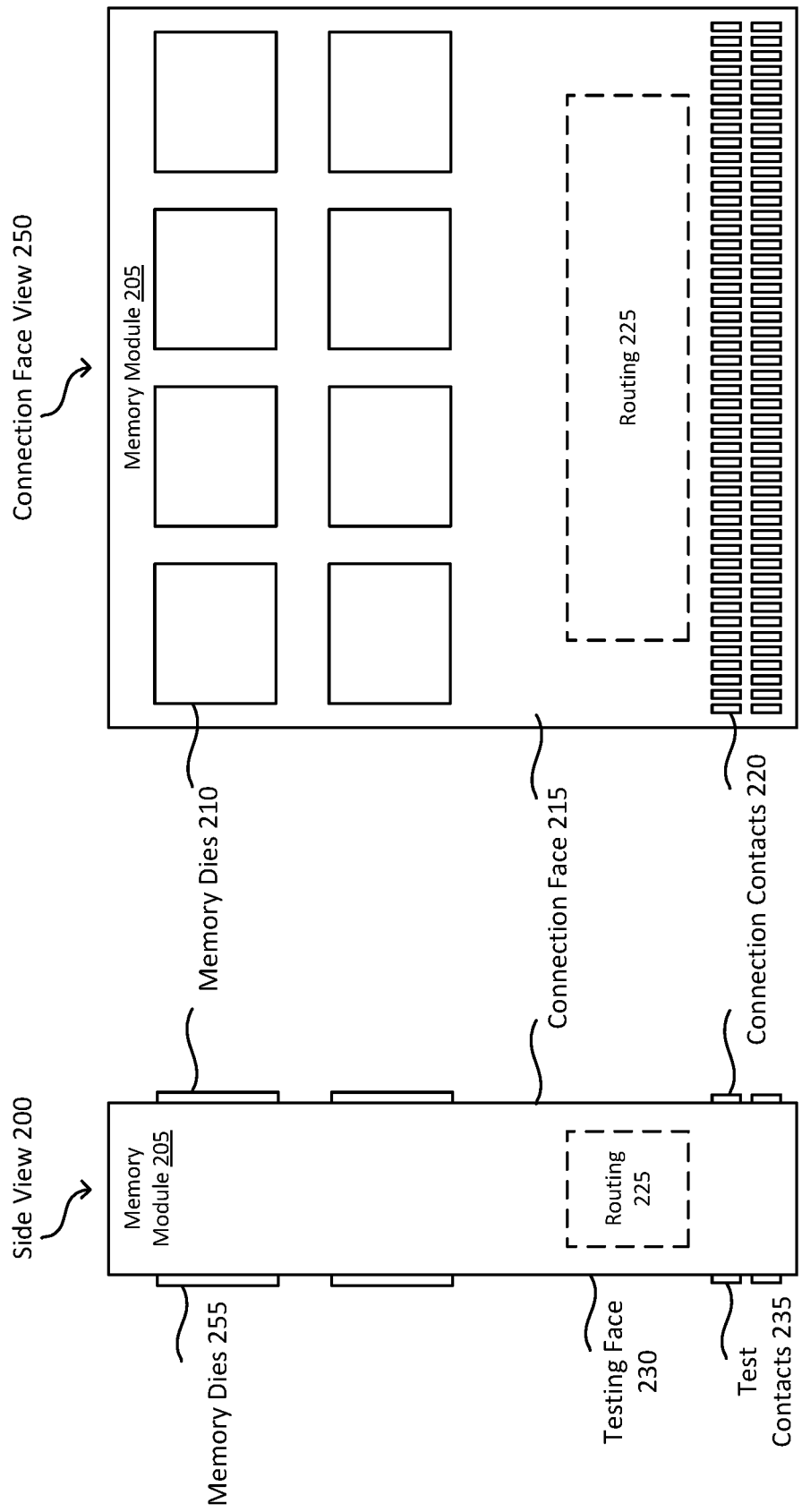

HIGH-CAPACITY SERVER MEMORY DEVICE IN A SINGLE UNIT FORM FACTOR

FIELD

Descriptions are generally related to computer servers; more particularly, descriptions are related to the memory device form factor.

BACKGROUND

In a data center, computing modules of a computer server system are typically mounted on a server rack. Computing modules such as server trays, sleds, blades, and nodes are positioned and stacked on top of each other in equipment racks within a server rack. The equipment racks may be provided in standard unit sizes, e.g., one unit (1 U), two units (2 U), or three units (3 U). In one example implementation, each unit has a height of 1.75 inches (about 44 mm).

Each computing module contains hardware circuitry for one or more computing resources such as processors, storage, network controllers, disk drives, cable ports, and power supplies. The computing modules are inserted into the equipment rack where an interface of the computing module electrically connects to a socket or an interface in the equipment rack. For example, one such computing module is the memory module. The memory module has one or more memory dies and provides random access memory (RAM) to the computer server system.

One way to increase the memory capacity of a memory module is to increase the capacity of each memory chip, e.g., by stacking two or more memory dies on top of each other by wire bonding or using through silicon vias (TSV). However, stacking memory chips (or memory dies) in a package often causes thermal challenges. In addition, accessing each die in a stack may require additional access pins. Another way to increase the memory capacity available to a server is using multiple memory modules occupying multiple 1 U equipment racks or one or more 2 U or 3 U equipment racks.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention and do not necessarily all refer to the same implementation. However, they are also not necessarily mutually exclusive.

FIG. 2A is a side view of an example of a memory module.

FIG. 2B is a view of the connection face of an example of a memory module.

Descriptions of certain details and implementations follow, including non-limiting descriptions of the figures, which may depict some or all examples, as well as other potential implementations.

DETAILED DESCRIPTION

As described herein, the server memory device in a computer system can have twice the memory capacity of a dual inline memory module (DIMM) while occupying one unit of the server rack (i.e., the same as a DIMM). The server memory device includes two memory modules; each can have the storage capacity of a DIMM. Each memory module is coupled and bonded with an interposer. Each interposer is coupled and bonded with the server memory device connector. The connector can be inserted in a 1 U equipment rack of a computer server system.

In some implementations, DIMM memory cards utilize gold fingers to connect to a server rack. For example, a dual data rate version 5 (DDR5) server dual-inline memory module (DIMM) has gold fingers connecting the DDR5 DIMM to a standard DDR5 connector on the server rack. In one example, the memory modules in the server memory device do not have gold fingers. Instead, each memory module is connected to an interposer through an array of contacts. The interposers are connected to a connector via arrays of contacts, and the connector is equipped with gold fingers for connecting to a standard connector on the server rack.

In one example, the server memory device has more memory ranks available than a standard 1 U memory module. A chip select command, used to select the memory chips, has double the ranks available to select from compared to a standard memory module. For example, if each memory module is equivalent to a 2R×4 DIMM, the memory device capacity would be equal to that of a 4R×4 DIMM. The interposer and connector provide a high-density interconnect that bonds two memory modules and creates a memory device of higher rank while occupying the same physical space in a server rack as a single DIMM would have.

Figure 1A:
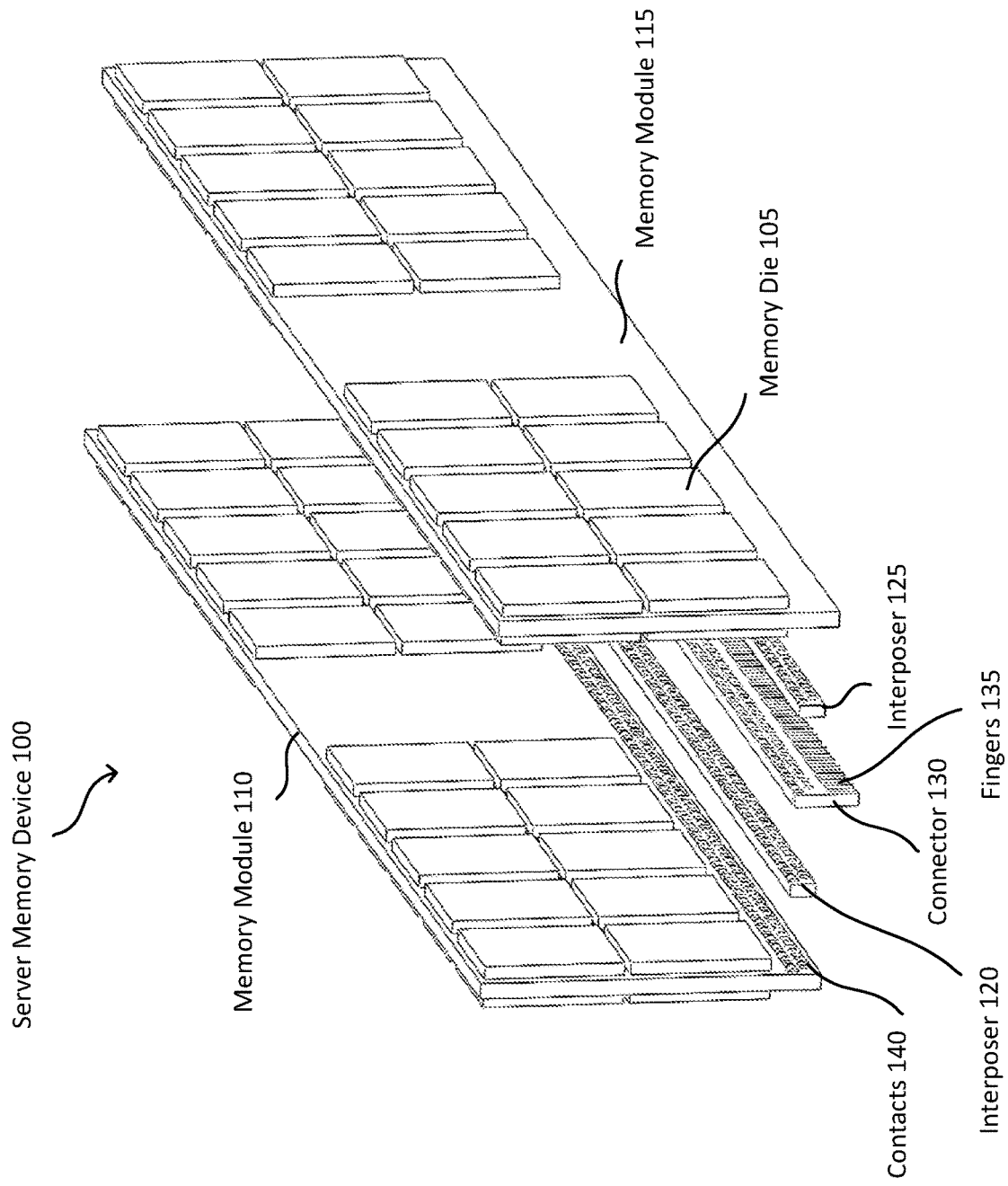
FIG. 1A is a perspective side view of an example of a disassembled server memory card.

FIG. 1A is a perspective side view of an example of a disassembled server memory device 100. Server memory device 100 includes memory modules 110 and 115, interposers 120 and 125, and connector 130. FIG. 1A shows the order of placement of components. For example, memory module 110 would be connected and bonded to interposer 120, and interposer 120 would be connected and bonded to connector 130. Similarly, memory module 115 would be connected and bonded to interposer 125, and interposer 125 would be connected and bonded to connector 130.

Memory modules 110 and 115 each can have one or more memory dies, for example, memory die 105. In one example, memory dies on memory module 115 has a different rank than memory dies on memory module 110. In one example, memory modules 110 and 115 are similar to DIMMs with modifications made to gold-fingers and traces to connect memory dies on both sides of the DIMM to the interposer. In one example, memory module 110 and memory module 115 are "fingerless" DIMMs, referring to a memory module that does not include fingers at the bottom of the board, which would normally be included to insert into a connector. In one example, contacts 140 connects memory module 110 to interposer 120. Thus, rather than the fingers at the bottom of the board, memory module 110 is fingerless, with contacts 140 to connect to interposer 120, which connects to connector 130 which includes fingers 135. Similarly, memory module 115 connects to interposer 125 using rows or arrays of contacts similar to contacts 140.

Interposer 120 connects memory module 110 to connector 130. Similarly, interposer 125 connects memory module 115 to connector 130. Interposer 120 on one side bonds and connects to memory module 110, and on the opposite side bonds and connects to connector 130. Traces of conductors and vias, collectively referred to as routing or routing traces, inside or on the surface of interposer 120, can provide electrical coupling and connection between memory module 110 and connector 130. In one example, interposers 120 and 125 are printed circuit boards (PCB) made from FR-4. In one example, connector 130 is a printed circuit board made from FR-4 material. In one example, the PCB is made of ceramic, glass, aluminum, or Teflon™.

In one example, interposers 120 and 125 are connected to connector 130 by soldering PCB leads, contacts, or a flexible cable. In one example, interposers 120 and 125 are connected to connector 130 by connector clips. In one example, interposers 120 and 125 are bonded to connector 130 by epoxy, soldering, clips, screws, or a combination. In one example, interposers 120 and 125 are connected and bonded to connector 130 by socket interconnection. In one example, interposers 120 and 125 are connected and bonded to connector 130 by pin interconnection. Here, connection means electrical connection, and coupling and bonding means physical contact in a physically stable structure.

In one example, connector 130 includes fingers 135. In one example, fingers 135 can connect to a standard dual data rate (DDR) memory socket, e.g., DDR version 4 (DDR4) or DDR5, on the server rack. In one example, memory module 110 and memory module 115 has the same layout and design. In one example, memory module 110 is the mirror image of memory module 115. The routing, e.g., traces, wires, and vias, on memory modules 110 and 115, on interposers 120 and 125, and on connector 130 provide the proper connection between memory dies on memory modules 110 and 115 and fingers 135 that is compatible with the standard connector socket on the server rack. In one example, routing on and inside interposer 120 differs from routing on and inside interposer 125.

FIG. 113 is a perspective view of an example of an array of server memory devices 150, which shows memory devices 1-5 and 155. Memory device 155 is an example of server memory device 100 in FIG. 1A. Memory module 160 is connected and bonded to interposer 170. Similarly, memory module 165 is connected and bonded to interposer 175. Interposers 170 and 175 are connected and bonded to connector 180 to make memory device 155. Connector 180 at one end is capable of being inserted into an equipment rack of a computer server system.

Figure 2C:
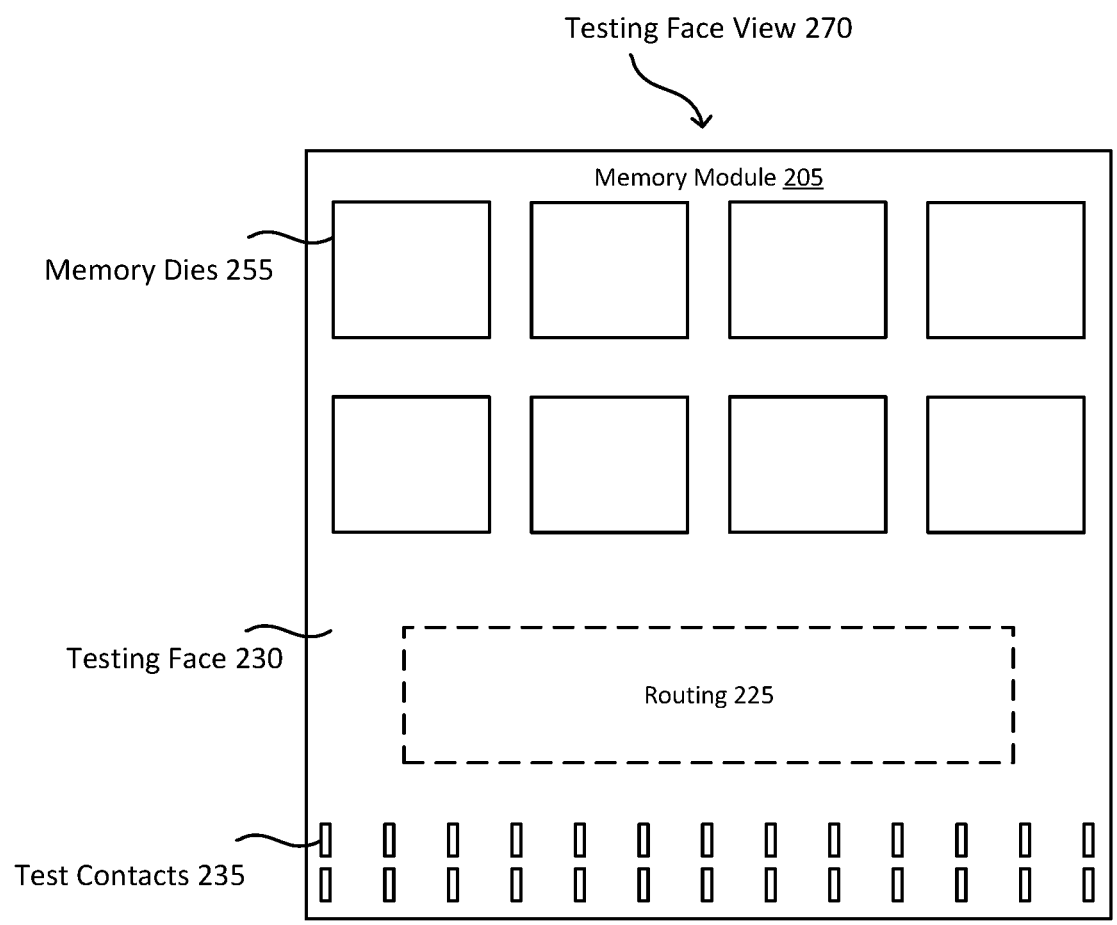
FIG. 2C is a view of the testing face of an example of a memory module.

FIG. 2A is side view 200, FIG. 2B is view 250 of the connection face 215, and FIG. 2C is view 270 of testing face 230 of an example of memory module 205. In one example implementation, memory module 205 has two faces on which components are mounted: connection face 215 and testing face 230, where connection face 215 is on the opposite side of testing face 230. In one example implementation, memory module 205 includes at least one memory chip, e.g., memory die 210 on connection face 215 or memory die 255 on testing face 230.

In one example implementation, memory module 205 has connection contacts 220 on connection face 215. Connection contacts 220 are the interface that enables electrical connection between the components on memory module 205 and external electrical systems such as processors or other computing devices. In one example, connection contacts 220 are an array of conductive electric contacts. In one example, connection contacts 220 are arranged in multiple rows of conductive electric contacts. In one example, connection contacts 220 are made of conductive metals or alloys such as silver, copper, or gold.

In one example implementation, memory module 205 has test contacts 235 on testing face 230. In one example implementation, test contacts 235 on testing face 230 are the interface that enables access to signaling in memory module 205 for testing, debugging, and troubleshooting purposes. Similar to connection contacts 220, test contacts 220 can be made of conductive metals or alloys such as silver, copper, or gold. In one example implementation, the number of test contacts 235 is less than the number of connection contacts 220. In one example implementation, the number of test contacts 235 is equal to the number of connection contacts 220.

In one example implementation, memory module 205 includes routing 225, which includes electric traces and vias. Routing 225 connects memory chips, e.g., memory dies 210 and 255, and other components on both sides of memory module 205, i.e., connection face 215 and testing face 230, to the connection contacts 220 and test contacts 235. In one example, routing 225 connects memory dies 255 on testing face 230 of memory module 205 to connection contacts 220 on connection face 215 of memory module 205, which allows memory dies 255 to be accessible via connection contacts 220. In one example, routing 225 connects memory dies 210 on connection face 230 of memory module 205 to connection contacts 220 on the connection face 215 of memory module 205, which allows memory dies 210 to be accessible via connection contacts 220. In one example, routing 225 connects memory dies 255 on the testing face 230 of memory module 205 to test contacts 235 on testing face 230 of memory module 205, which allows memory dies 255 to be accessible via test contacts 235. In one example, routing 225 connects memory dies 210 on connection face 215 of memory module 205 to test contacts 235 on testing face 230 of memory module 205, which allows memory dies 210 to be accessible via test contacts 235.

Memory module 205 includes routing on and through the board to connect memory dies 210 to connection contacts 220 and test contacts 235. Connection contacts 220 enable memory module 205 to exchange signals with a host system in which the memory is mounted. Routing 225 routes signals from connection contacts 220 to corresponding signal pins of memory dies 210.

In one example implementation, memory module 205 is a printed circuit board (PCB), and electric traces in routing 225 are copper conductors on the PCB that carry electric signals on the surface of the PCB. In one example, PCB has multiple layers, and the routing traces exist on multiple layers or all layers. Vias in routing 225 are the electrical connection between conductor traces and layers in a PCB. A via is a hole that goes through two or more adjacent layers of a PCB; the hole is plated with a conductor, e.g., copper, that forms an electrical connection through the dielectric that separates the conductive layers in the PCB. In one example implementation, memory module 205 is an example of memory module 110 or memory module 115 in FIG. 1A.

In one example, memory die 210 is a volatile memory. Volatile memory loses its stored data when the power to the memory die is turned off. In one example, memory die 210 is a random-access memory (RAM). In one example, memory 210 is a dynamic random-access memory (DRAM). In one example, memory die 210 is a synchronous dynamic random-access memory (SDRAM). In one example, memory die 210 is a double data rate SDRAM (DDR SDRAM).

Figure 3A:
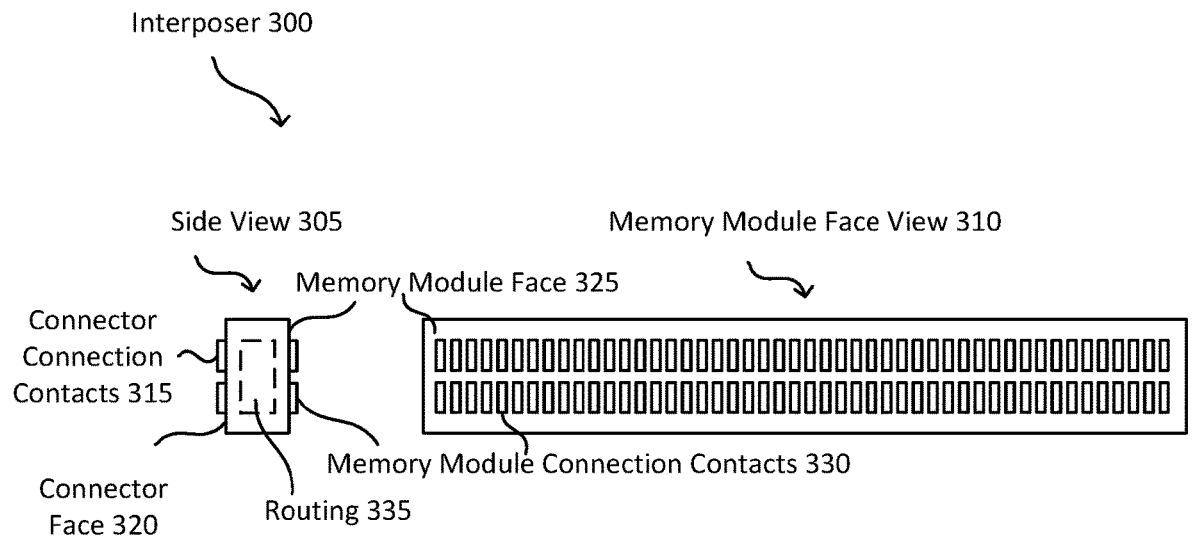
FIG. 3A illustrates a side view and the memory face view of an example of an interposer.

FIG. 3A illustrates side view 305 and the memory face view 310 of an example of interposer 300. In one example implementation, interposer 300 has two faces on which connection contacts are placed: connector face 320 and memory module face 325, where connector face 320 is on the opposite side of the memory module face 325. In one example, interposer 300 has routing 335, including routing traces and vias connecting memory module connection contacts 330 to connector connection contacts 315. In one example implementation, interposer 300 is an example of interposer 120 or interposer 125 in FIG. 1A.

Interposer 300 enables a memory module to connect to a connector board that mounts into a system connector slot. In one example, the pinout of the connector board matches the pinout of the memory module board. In such an implementation, memory module connection contacts 330 can electrically connect to corresponding signal contacts of connector connection contacts 315, straight through interposer 300, with vias providing the electrical connection. In one example, the pinout of the connector board and the pinout of the memory module board have at least some signal contact differences. In such an implementation, routing 335 provides an electrical path to connect memory module connection contacts 330 to corresponding signal contacts of connector connection contacts 315. Routing 335 can have lateral wires, traces, or signal paths to electrically align signal contacts on memory module face 325 with corresponding signal contacts on connector face 320.

Figure 3B:
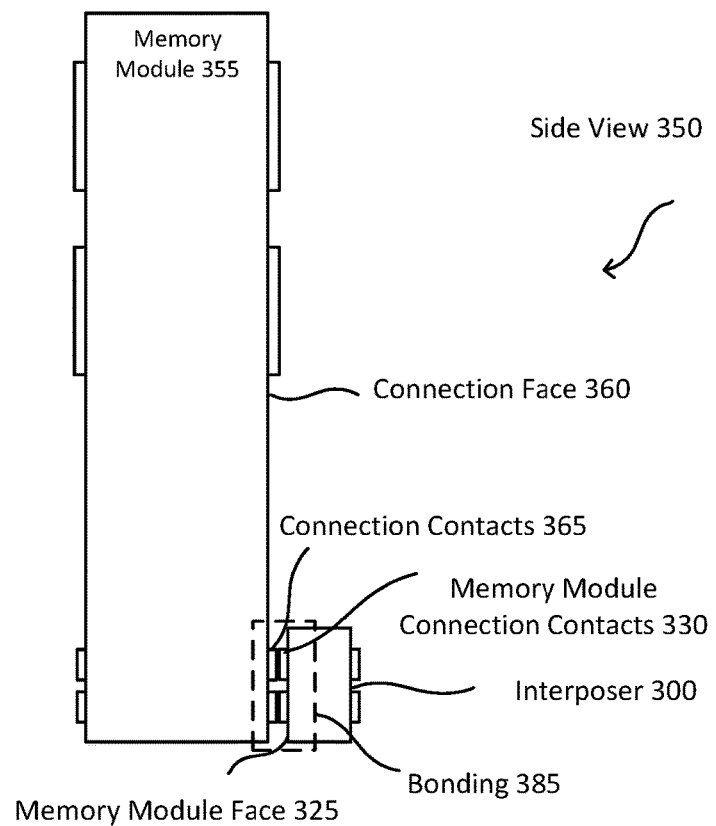
FIG. 3B illustrates a side view of an example of a memory module coupled and bonded with an interposer.

FIG. 3B illustrates a side view 350 of an example of memory module 355 coupled and bonded with interposer 300. Memory module 355 is an example of memory module 205 in FIGS. 2A, 2B, and 2C. In one example, connection contacts 365 on connection face 360 of memory module 355 make electrical connections with memory module connection contacts 330 on memory module face 325 of interposer 300. In one example, mechanical bonding 385 prevents memory module 355 from separating from interposer 300. In one example, bonding 385 includes soldering connection contacts 365 to memory module connection contacts 330. In one example, bonding 385 includes adhesive that connects connection face 360 of memory module 355 to memory module face 325 of interposer 300.

Figure 4A:
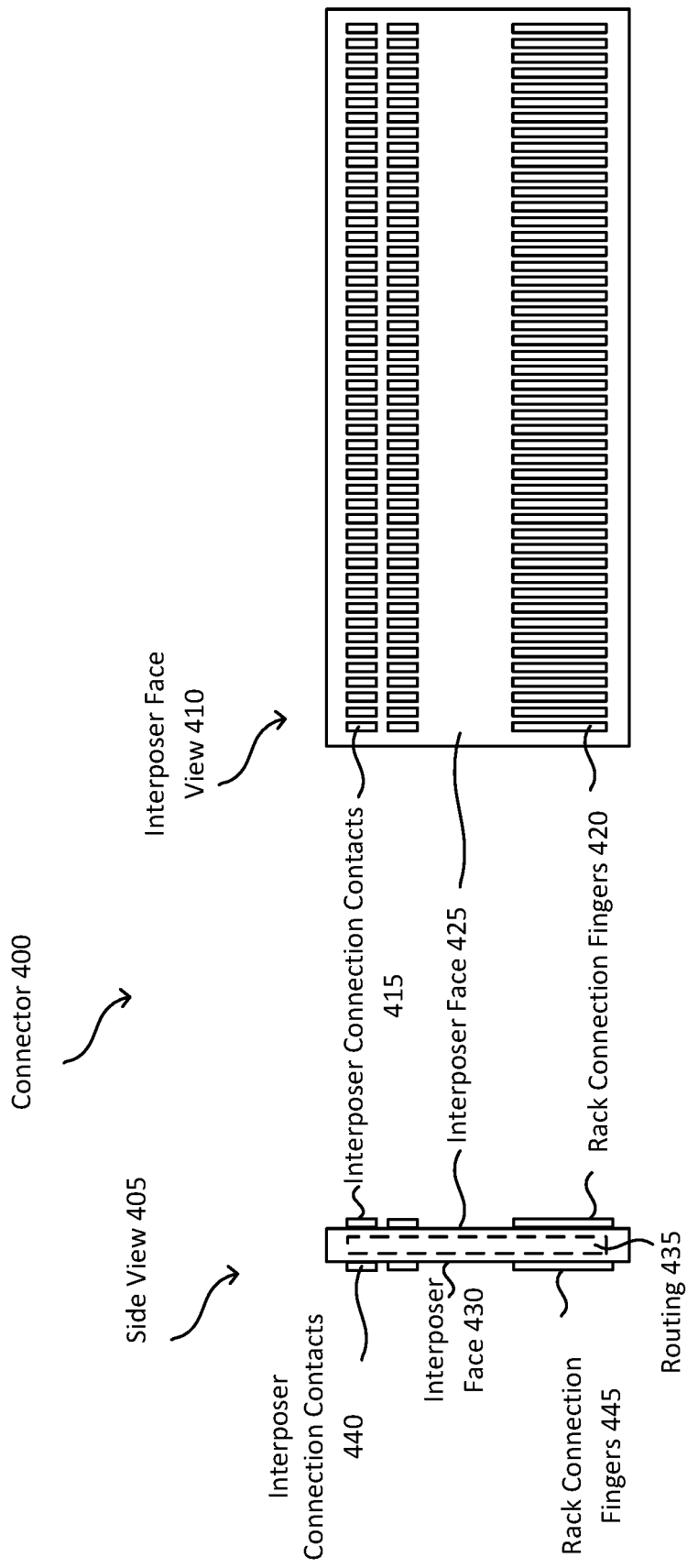
FIG. 4A illustrates a side view and a connector face view of an example of a connector.

FIG. 4A illustrates side view 405 and interposer face view 410 of an example of connector 400. In one example implementation, connector 400 has two faces on which connection fingers and connection contacts are placed: interposer face 430 and interposer face 425, where interposer face 430 is on the opposite side of the interposer face 425. Thus, connector 400 can connect and bond to two interposers, one on interposer face 425 and one on interposer face 430. In one example implementation, the components on interposer face 425 are the same as those on interposer face 430. On Interposer face 425, connector 400 includes interposer connection contacts 415 and rack connection fingers 420. In one example, connector 400 has routing 435, as described above, including routing traces and vias connecting interposer connection contacts 415 to rack connection fingers 420 on interposer face 425 and connecting interposer connection contacts 440 to rack connection fingers 445 on interposer face 430. In one example implementation, connector 400 is a printed circuit board (PCB). In one example implementation, connector 400 is an example of connector 130 in FIG. 1A.

Figure 4B:
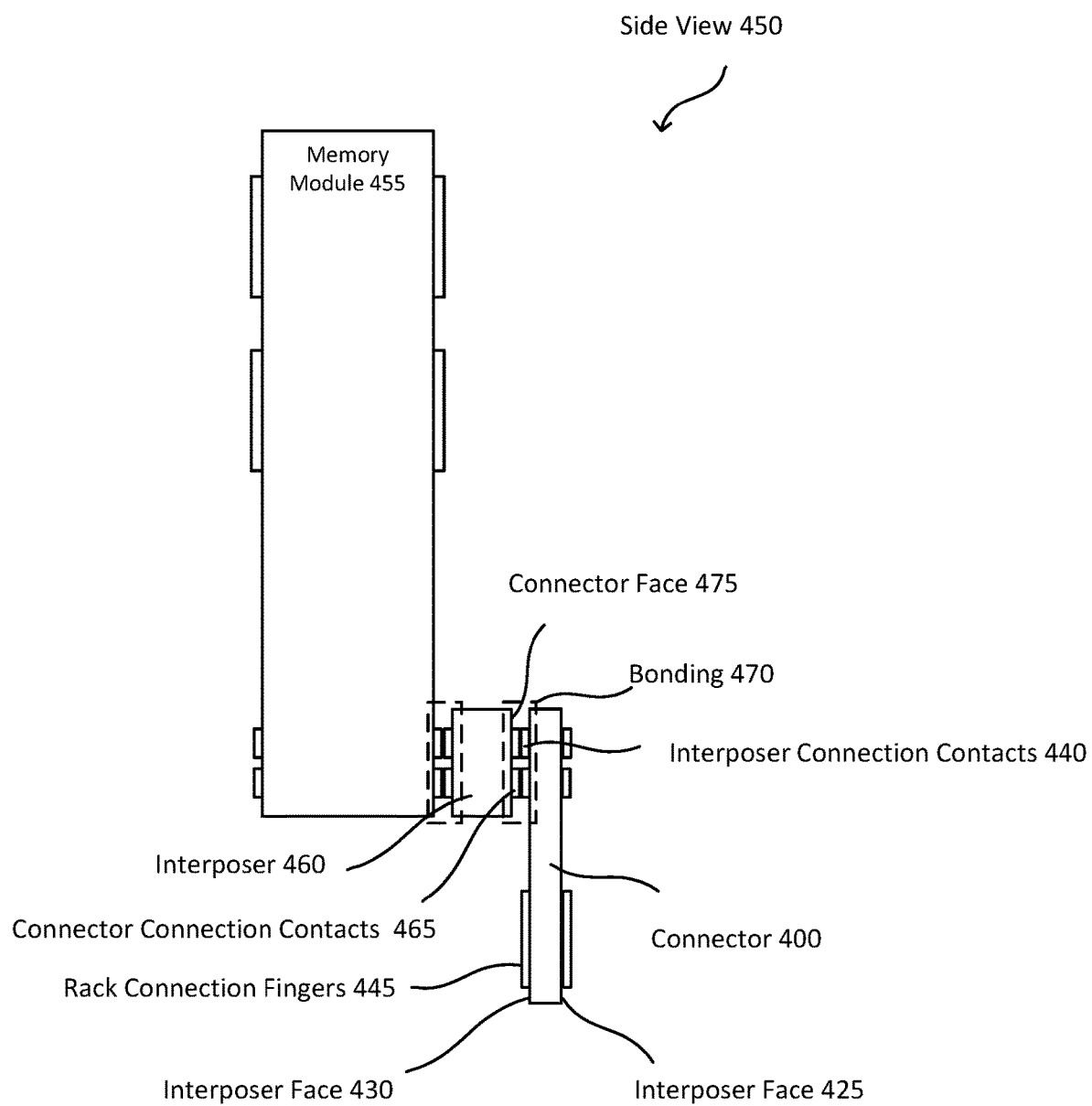
FIG. 4B illustrates a side view of an example of an interposer coupled and bonded with a connector.

FIG. 4B illustrates a side view 450 of an example of interposer 460 coupled and bonded with connector 400. FIG. 4B shows memory module 455 connected and bonded with interposer 460, and interposer 460 connected and bonded with connector 400. In one example implementation, memory module 455 is an example of memory module 355 in FIG. 3B. In one example implementation, interposer 460 is an example of interposer 300 in FIG. 3B.

In one example, connector connection contacts 465 on connector face 475 of interposer 460 make electrical connections with imposer connection contacts 440 on interposer face 430 of connector 400. In one example, bonding 470 includes soldering connector connection contacts 465 to interposer connection contacts 440. In one example, mechanical bonding 470 includes an adhesive that connects connector face 475 to interposer face 430.

In one example implementation, a second memory module can connect and bond to a second interposer where the second interposer, in turn, connects and bonds to connection contacts on interposer face 425 of connector 400 in a similar manner that memory module 455 is connected and bonded to interposer 460 and interposer 460 is connected and bonded to connector 400.

Figure 5:
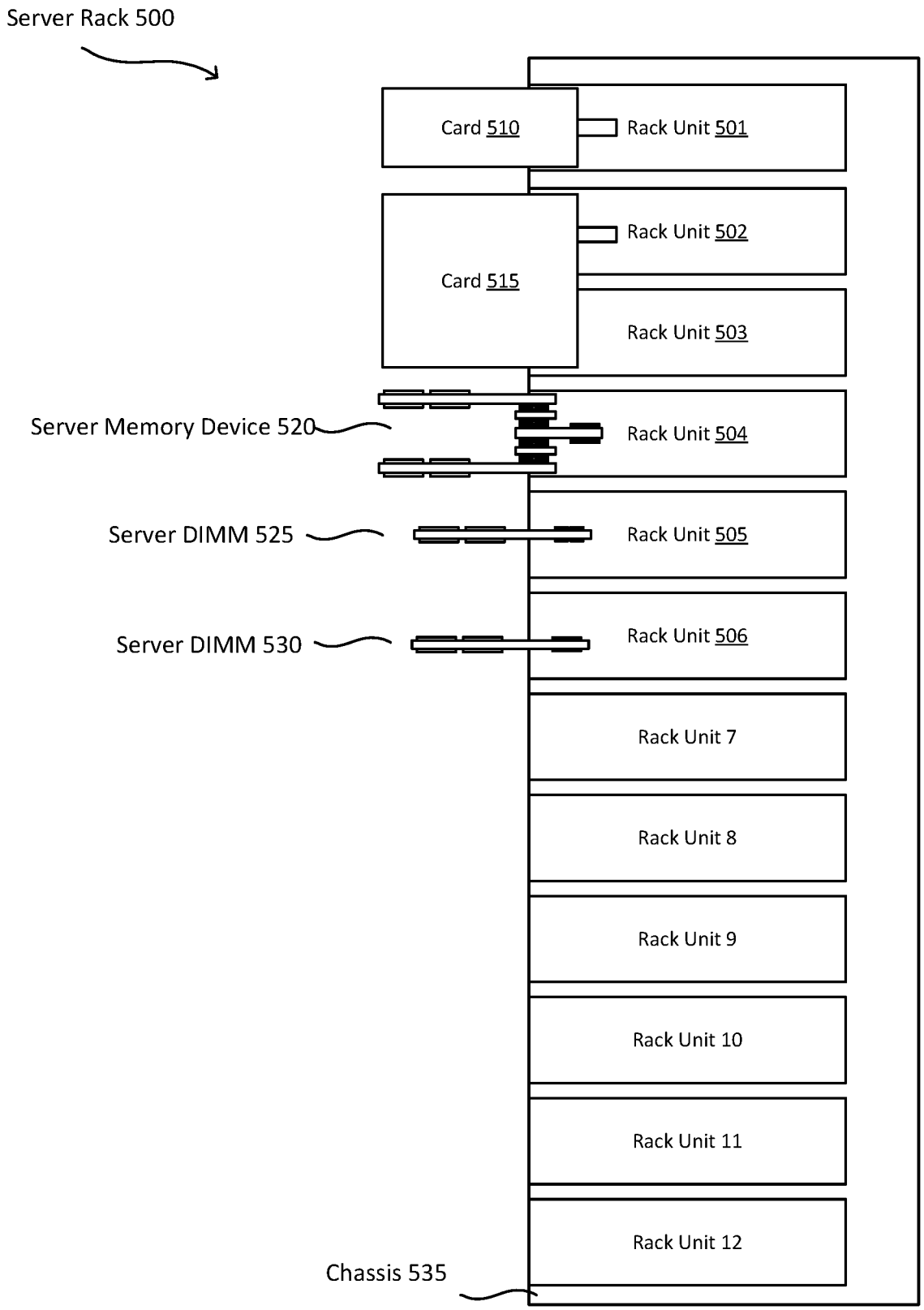
FIG. 5 illustrates an example of a server rack.

FIG. 5 illustrates an example of server rack 500. In one example, server rack 500 includes chassis 535 and one or more rack units 501-506. Compute devices such as processor cards or memory devices, e.g., card 510 and 515, server memory device 520, and server DIMM 525 and 530. In one example, server rack 500 does not have a chassis 535. In one example, server rack 500 includes wirings, connection cables, cooling fans, and power supply connections and cables that are not shown in FIG. 5.

In one example, devices are inserted in rack units. Rack units typically have a standard height. Some devices occupy a single rack unit (1 U). Card 510 is an example of a device that occupies a single rack unit 501. Some bigger devices can cover or occupy two rack units (2 U). Card 515 is an example of a bigger device that occupies two rack units 502 and 503.

Figure 1B:
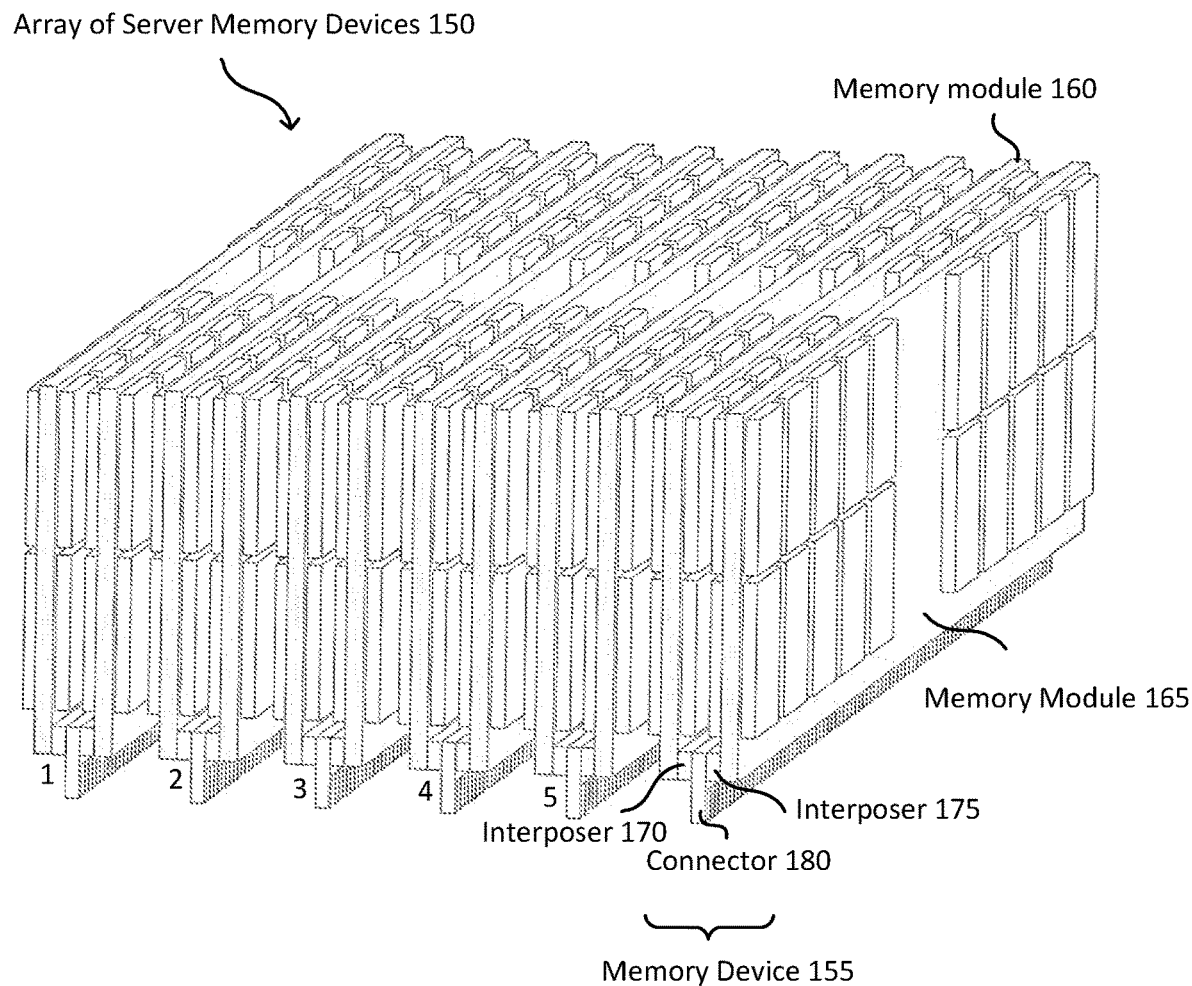
FIG. 1B is a perspective side view of an example of an array of server memory cards.

Server memory device 520 is an example of server memory device 100 in FIG. 1. Server memory device 520 includes two memory modules; each memory module has a storage capacity of server DIMM 525 or DIMM 530. Server memory device 520 provides the same amount of memory storage as server DIMM 525 and 530. Server memory device 520 occupies a single rack unit 504, whereas DIMM 525 and 530 occupy two rack units 505 and 506, respectively.

Figure 6:
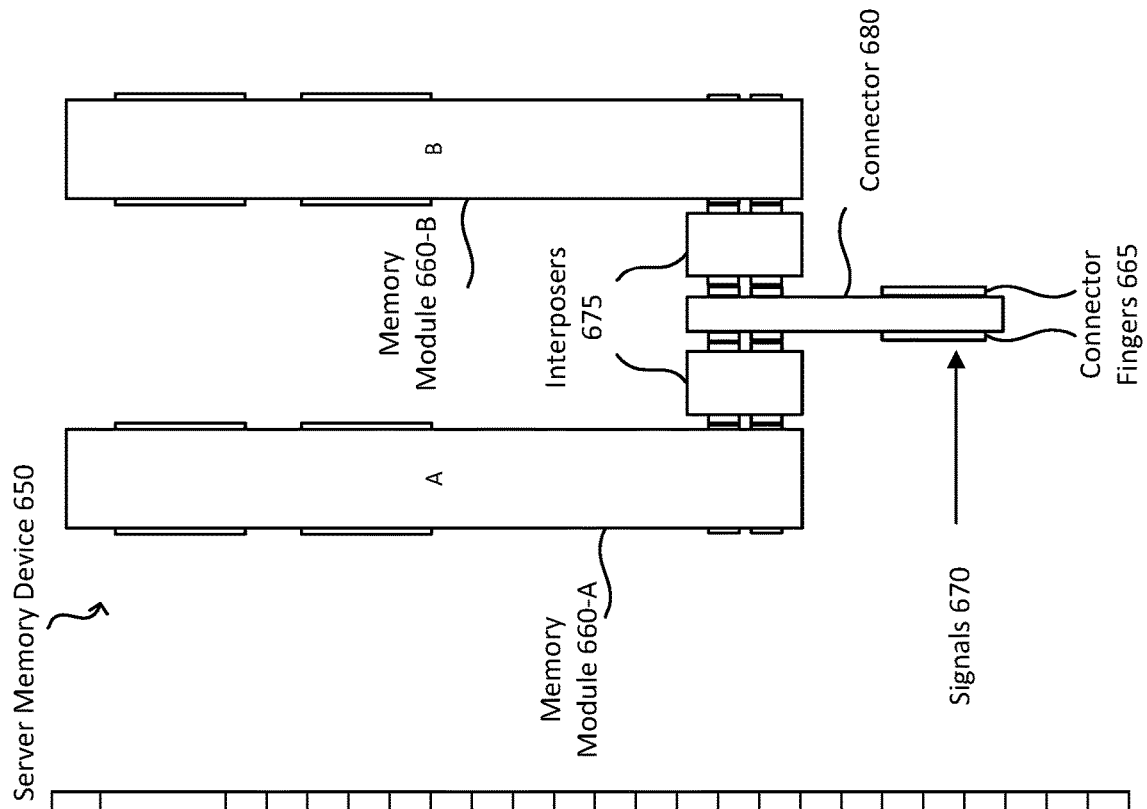
FIG. 6 is a table containing an example of commands for selecting and accessing memory dies on memory modules in a server memory device.

FIG. 6 includes table 600, containing an example of signals 670 carrying signals and commands for access and operation of memory dies on memory modules 660 in server memory device 650. Each row 655 of table 600 indicates a signal 670, received on connector fingers 665 and the targeted memory module 660. Row group 605 includes signals 670 for selecting memory modules 660-A and 660-

B. Row group 610 includes signals 670 for parity inputs for memory modules 660-A and 660-B. Signals 670 in row group 615 are clock signals for memory modules 660-A and 660-B. Row group 620 includes signals 670 for accessing memory modules 660-A and 660-B, including command and address signals. In one example, the signals 670 are commands used for selecting and accessing DIMM memory cards. The same signals are used and received by connector fingers 665. The contacts and routings on memory modules 660, interposers 675, and connector 680 enable the system issuing signal 670 to access DIMM memory cards and server memory device 650 seamlessly. Connector fingers 665 column in table 600 includes P1-P22, which are representative of specific contact (or pin) numbers on a memory module identified by memory modules 660. For example, signal SA_CS_N[0] is received on contact P1 of memory module 660-A.

Figure 7:
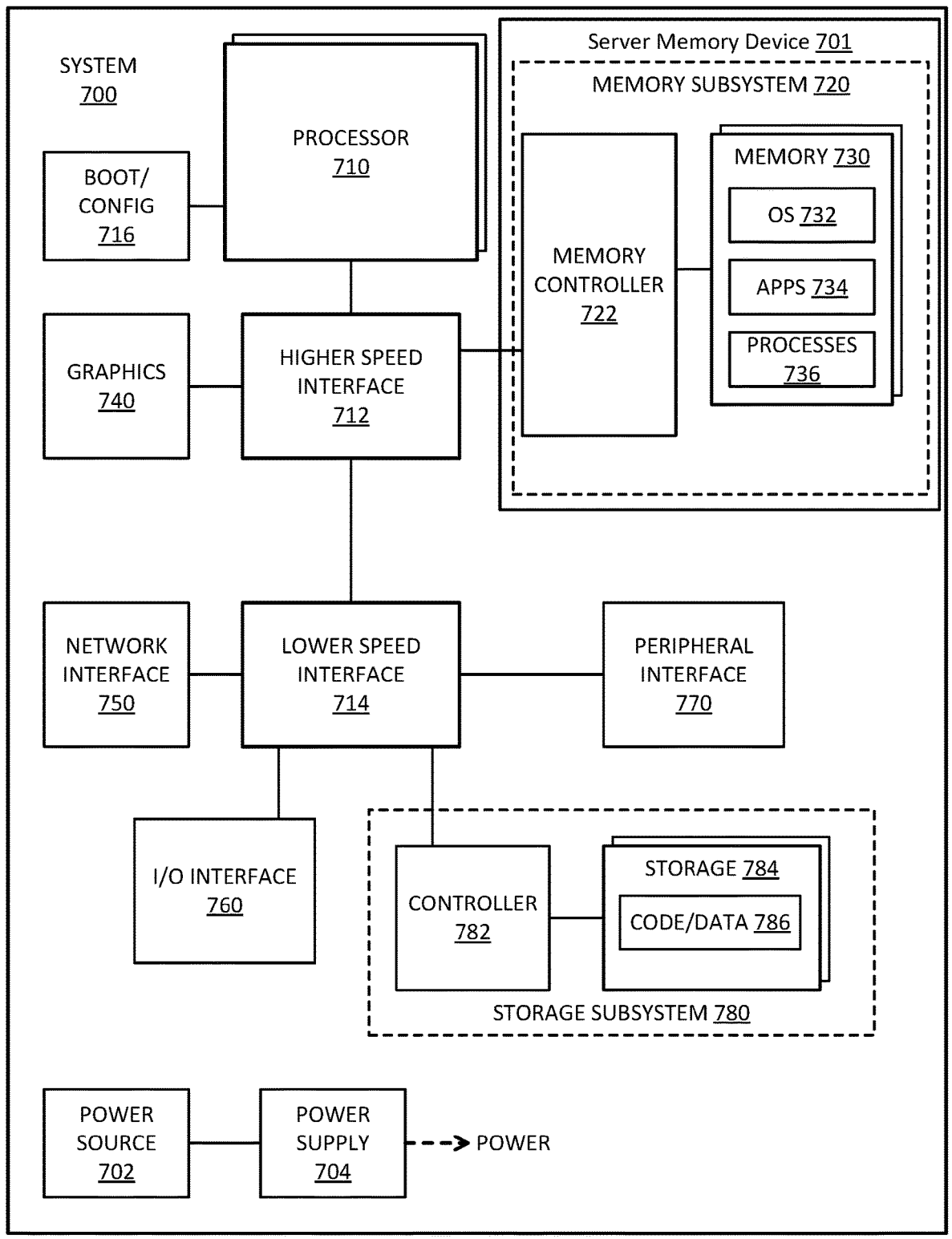
FIG. 7 is a block diagram of an example of a computing system in which a server memory device is implemented.

FIG. 7 is a block diagram of an example of a computing system in which server memory device 701 is implemented. System 700 represents a computing device in accordance with any example herein and can be a laptop computer, a desktop computer, a tablet computer, a server, a gaming or entertainment control system, an embedded computing device, or other electronic devices.

In one example, system 700 includes server memory device 701, where server memory device 701 is an example of server memory device 100. In one example, server memory device 701 includes two memory modules, each connected and bonded to an interposer, and each interposer is connected and bonded to the same connector. The connector is the interface that provides a physical connection between server memory device 701 and system 700.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700 and can be or include one or more programmable general-purpose or special-purpose microprocessors, digital signal processors (DSPs), programmable controllers, application-specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system-level hardware that operates outside of a host OS (operating system). Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700 and provides storage for code to be executed by processor 710 or data values to be used in executing a routine. Memory subsystem 720 can include one or more varieties of random-access memory (RAM) such as DRAM, 3DXP (three-dimensional crosspoint), other memory devices, or a combination of such devices. Memory 730 stores and hosts, among other things, operating system (OS) 732 to provide a software platform for executing instructions in system 700. Additionally, applications 734 can execute on the software platform of OS 732 from memory 730. Applications 734 represent programs with their own operational logic to execute one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not explicitly illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other buses, or a combination.

In one example, system 700 includes interface 714, which can be coupled to interface 712. Interface 714 can be a lower-speed interface than interface 712. In one example, interface 714 represents an interface circuit, which can include standalone components and integrated circuitry. In one example, multiple user interface components, peripheral components, or both are coupled to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacings). Peripheral interface 770 can include any hardware interface not specifically mentioned above. Peripherals refer generally to devices that connect dependently to system 700. A dependent connection is one where system 700 provides the software platform or hardware platform or both on which operation executes and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, NAND, 3DXP, or optical-based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is non-volatile, memory 730 can include volatile memory (i.e., the value or state of the data is indeterminate if power is interrupted to system 700). In one example, storage subsystem 780 includes controller 782 to interface with storage 784. In one example, controller 782 is a physical part of interface 714 or processor 710 or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
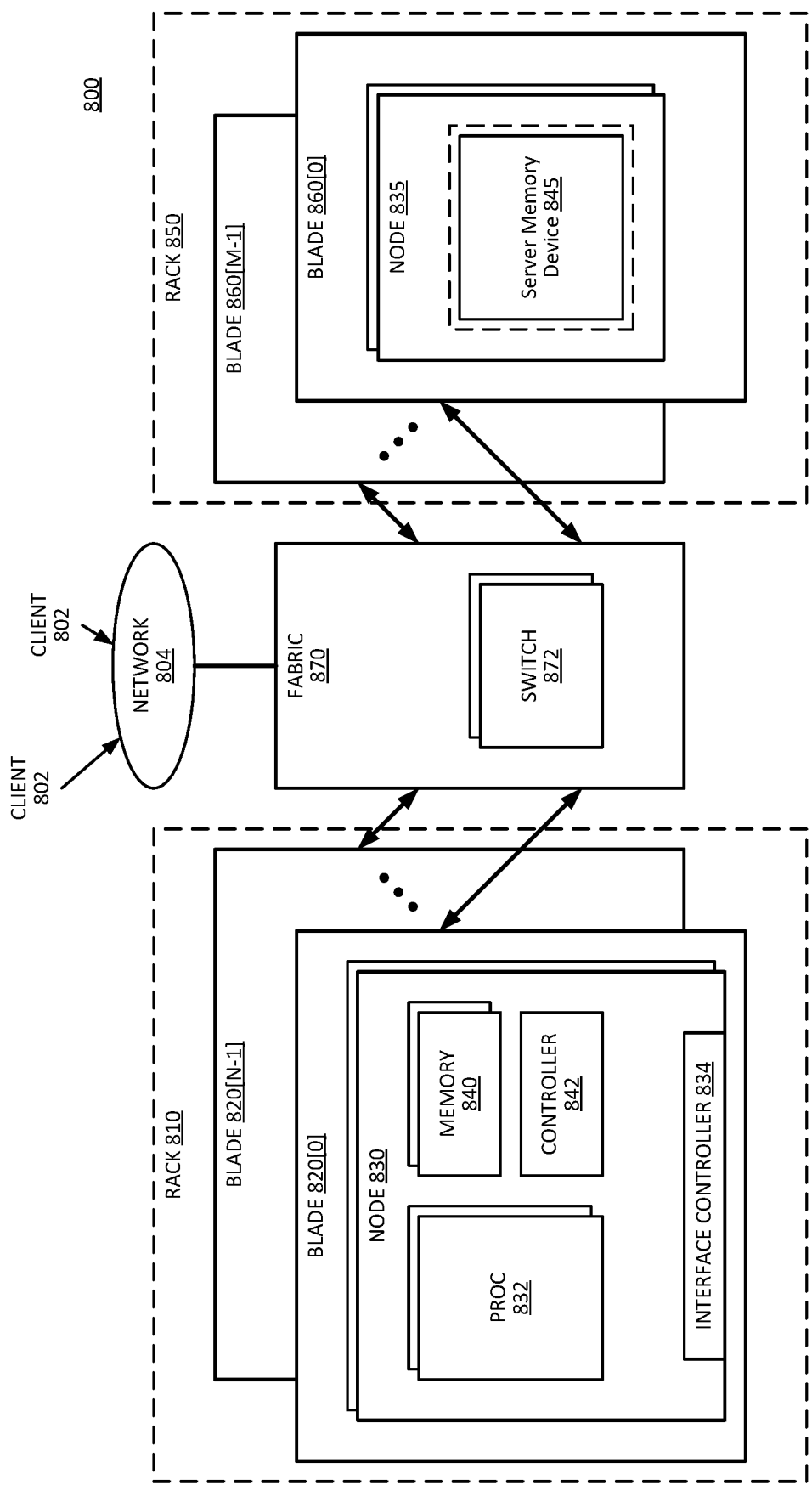
FIG. 8 is a block diagram of an example of a multi-node network in which a server memory device is implemented.

FIG. 8 is a block diagram of an example of a multi-node network in which a server memory device can be implemented. System 800 represents a network of nodes. In one example, system 800 represents a data center. In one example, system 800 represents a server farm. In one example, system 800 represents a data cloud or a processing cloud.

Node 835 represents a computing device of blade 860[0] in system 800. In one example, node 835 represents hardware components to implement server memory device 845. In one example, server memory device 855 is an example of server memory device 100 in FIG. 1. The server memory device 855 includes two memory modules, each connected and bonded to a separate interposer, and each interposer is connected and bonded to the same connector. The connector is the interface that provides electrical coupling between server memory device 855 and rack 810.

One or more clients 802 make requests over network 804 to system 800. Network 804 represents one or more local networks, wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include a housing with an exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blades 860. M is not necessarily the same as N; thus, it will be understood that various different hardware equipment components could be used and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

For simplicity, only the node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840. A storage server refers to a node with more storage resources than a computation node, and rather than having processors for the execution of tasks, a storage server includes processing resources to manage access to the storage nodes within the storage server.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory

840 can be or include memory devices represented by memory 840 and a memory controller represented by controller 842.

The following are examples in accordance with the descriptions herein.

Example 1: an apparatus for use in a computer system including: a first memory module having a first memory module memory die; a second memory module having a second memory module memory die; a first interposer coupled and bonded with the first memory module; a second interposer coupled and bonded with the second memory module; and a connector: coupled and bonded with the first interposer on a connector first surface, coupled and bonded with the second interposer on a connector second surface on an opposite side of the connector from the connector first surface, and capable to couple with the computer system.

Example 2: the apparatus of example 1, wherein: the first memory module has a first memory module first surface and a first memory module second surface on an opposite side of the first memory module from the memory module first surface, the second memory module has a second memory module first surface and a second memory module second surface on an opposite side of the second memory module from the second memory module first surface, the first interposer has a first interposer first surface and a first interposer second surface on an opposite side of the first interposer from the first interposer first surface, the second interposer has a second interposer first surface and a second interposer second surface on an opposite side of the second interposer from the second interposer first surface, the first memory module first surface is connected and bonded to the first interposer first surface, the second memory module first surface is connected and bonded to the second interposer first surface, the first interposer second surface is connected and bonded to the connector first surface, and, the second interposer second surface is connected and bonded to the connector second surface.

Example 3: the apparatus of examples 1 or 2, wherein: the first memory module first surface includes a plurality of first memory module first surface connection contacts, the first interposer first surface includes a plurality of first interposer first surface connection contacts, and the first memory module is coupled with the first interposer by connection between the plurality of first memory module first surface connection contacts and the plurality of first interposer first surface connection contacts.

Example 4: the apparatus of any of examples 1-3, wherein: the second memory module first surface includes a plurality of second memory module first surface connection contacts, the second interposer first surface includes a plurality of second interposer first surface connection contacts, and the second memory module is coupled with the second interposer by connection between the plurality of second memory module first surface connection contacts and the plurality of second interposer first surface connection contacts.

Example 5: the apparatus of any of examples 1-4, wherein: the first interposer second surface includes a plurality of first interposer second surface connection contacts, the connector first surface includes a plurality of connector first surface connection contacts, and the first interposer is coupled with the connector by connection between the plurality of first interposer second surface connection contacts and the plurality of connector first surface connection contacts.

Example 6: the apparatus of any of examples 1-5, wherein: the second interposer second surface includes a plurality of second interposer second surface connection contacts, the connector second surface includes a plurality of connector second surface connection contacts, and the second interposer is coupled with the connector by connection between the plurality of second interposer second surface connection contacts and the plurality of connector second surface connection contacts.

Example 7: the apparatus of any of examples 1-6, wherein: the first memory module second surface includes a plurality of first memory module second surface test contacts to be used to test the first memory module memory die.

Example 8: the apparatus of any of examples 1-7, wherein the first memory module second surface includes fewer contacts than the first memory module first surface.

Example 9: the apparatus of any of examples 1-8, wherein: the second memory module second surface includes a plurality of second memory module second surface test contacts to be used to test the second memory module memory die.

Example 10: the apparatus of any of examples 1-9, wherein the second memory module second surface has fewer contacts than the second memory module first surface.

Example 11: the apparatus of any of examples 1-10, wherein the first memory module includes: a first memory module second surface memory die mounted on the first memory module second surface, and a plurality of first memory module traces and a plurality of first memory module vias to connect the first memory module second surface memory die to the first memory module first surface connection contacts.

Example 12: the apparatus of any of examples 1-11, wherein the second memory module includes: a second memory module second surface memory die mounted on the second memory module second surface, and a plurality of second memory module traces and a plurality of second memory module vias to connect the second memory module second surface memory die to the second memory module first surface connection contacts.

Example 13: the apparatus of any examples 1-12, wherein: the connector first surface includes a plurality of connector first surface computer system connection contacts, a plurality of connector traces, and a plurality of connector vias, and the plurality of connector traces and the plurality of connector vias to connect the plurality of connector first surface connection contacts to the plurality of connector first surface computer system connection contacts.

Example 14: the apparatus of any examples 1-13, wherein: the connector second surface includes a plurality of connector second surface computer system connection contacts, and the plurality of connector traces and the plurality of connector vias to connect the plurality of connector second surface connection contacts to the plurality of connector first surface computer system connection contacts.

Example 15: a system including: a rack to house and interconnect computation resources; a processor device coupled to the rack; a memory device coupled to the rack, the memory device including: a first memory module having a at least one first memory module memory chip; a second memory module having a at least one second memory module memory chip; a first interposer coupled and bonded with the first memory module; a second interposer coupled and bonded with the second memory module; and a connector: coupled and bonded with the first interposer on a connector first surface, coupled and bonded with the second interposer on a connector second surface, wherein the connector first surface is on the opposite side of the connector second surface.

Example 16: the system of example 15, wherein: the first memory module has a first memory module first surface and a first memory module second surface, wherein the first memory module first surface is on the opposite side of the first memory module second surface, the second memory module has a second memory module first surface and a second memory module second surface, wherein the second memory module first surface is on the opposite side of the second memory module second surface, the first interposer has a first interposer first surface and a first interposer second surface, wherein the first interposer first surface is on the opposite side of the first interposer second surface, the second interposer has a second interposer first surface and a second interposer second surface, wherein the second interposer first surface is on the opposite side of the second interposer second surface, the first memory module first surface is connected and bonded to the first interposer first surface, the second memory module first surface is connected and bonded to the second interposer first surface, the first interposer second surface is connected and bonded to the connector first surface, and, the second interposer second surface is connected and bonded to the connector second surface.

Example 17: the system of examples 15 or 16, wherein: the first memory module first surface includes a plurality of first memory module first surface connection contacts, the first interposer first surface includes a plurality of first interposer first surface connection contacts, the first memory module is coupled with the first interposer by connection between the plurality of first memory module first surface connection contacts and the plurality of first interposer first surface connection contacts, the second memory module first surface includes a plurality of second memory module first surface connection contacts, the second interposer first surface includes a plurality of second interposer first surface connection contacts, and the second memory module is coupled with the second interposer by connection between the plurality of second memory module first surface connection contacts and the plurality of second interposer first surface connection contacts.

Example 18: the system of any of examples 15-17, wherein: the first interposer second surface includes a plurality of first interposer second surface connection contacts, the connector first surface includes a plurality of connector first surface connection contacts, the first interposer is coupled with the connector by connection between the plurality of first interposer second surface connection contacts and the plurality of connector first surface connection contacts, the second interposer second surface includes a plurality of second interposer second surface connection contacts, the connector second surface includes a plurality of connector second surface connection contacts, and the second interposer is coupled with the connector by connection between the plurality of second interposer second surface connection contacts and the plurality of connector second surface connection contacts.

Example 19: the system of any of examples 15-18, wherein: the first memory module second surface includes a plurality of first memory module second surface test contacts to be used to test the at least one first memory module memory chip, wherein the first memory module second surface includes fewer contacts than the first memory module first surface, and the second memory module second surface includes a plurality of second memory module second surface test contacts to be used to test the at least one second memory module memory chip, wherein the second memory module second surface has fewer contacts than the second memory module first surface.

Example 20: the system of any of examples 15-19, wherein: the connector includes a plurality of connector traces, and a plurality of connector vias, the connector first surface includes a plurality of connector first surface computer system connection contacts, the connector second surface includes a plurality of connector second surface computer system connection contacts, the plurality of connector traces and the plurality of connector vias to connect the plurality of connector first surface connection contacts to the plurality of connector first surface computer system connection contacts, and the plurality of connector traces and the plurality of connector vias to connect the plurality of connector second surface connection contacts to the plurality of connector first surface computer system connection contacts.

Flow diagrams, as illustrated herein, provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, the order of the actions can be modified unless otherwise specified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon or via a method of operating a communication interface to send data via the communication interface. A machine-readable storage medium can cause a machine to perform the functions or operations described and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application-specific hardware, application-specific integrated circuits (ASICs), digital signal processors (DSPs), etc.), embedded controllers, hard-wired circuitry, etc.

Besides what is described herein, various modifications can be made to what is disclosed and implementations of the invention without departing from their scope. Therefore, the illustrations and examples herein should be construed in an illustrative and not a restrictive sense. The scope of the invention should be measured solely by reference to the claims that follow.

What is claimed is:

1. An apparatus for use in a computer system comprising:
a first memory module having a first memory module memory die;
a second memory module having a second memory module memory die;
a first interposer coupled and bonded with the first memory module;
a second interposer coupled and bonded with the second memory module; and
a connector:
coupled and bonded with the first interposer on a connector first surface,
coupled and bonded with the second interposer on a connector second surface on an opposite side of the connector from the connector first surface, and
capable to couple with the computer system.

2. The apparatus of claim 1, wherein:
the first memory module has a first memory module first surface and a first memory module second surface on an opposite side of the first memory module from the memory module first surface,
the second memory module has a second memory module first surface and a second memory module second surface on an opposite side of the second memory module from the second memory module first surface,
the first interposer has a first interposer first surface and a first interposer second surface on an opposite side of the first interposer from the first interposer first surface,
the second interposer has a second interposer first surface and a second interposer second surface on an opposite side of the second interposer from the second interposer first surface,
the first memory module first surface is connected and bonded to the first interposer first surface,
the second memory module first surface is connected and bonded to the second interposer first surface,
the first interposer second surface is connected and bonded to the connector first surface, and,
the second interposer second surface is connected and bonded to the connector second surface.

3. The apparatus of claim 2, wherein:
the first memory module first surface includes a plurality of first memory module first surface connection contacts,
the first interposer first surface includes a plurality of first interposer first surface connection contacts, and
the first memory module is coupled with the first interposer by connection between the plurality of first memory module first surface connection contacts and the plurality of first interposer first surface connection contacts.

4. The apparatus of claim 2, wherein:
the second memory module first surface includes a plurality of second memory module first surface connection contacts,
the second interposer first surface includes a plurality of second interposer first surface connection contacts, and
the second memory module is coupled with the second interposer by connection between the plurality of second memory module first surface connection contacts and the plurality of second interposer first surface connection contacts.

5. The apparatus of claim 2, wherein:
the first interposer second surface includes a plurality of first interposer second surface connection contacts,
the connector first surface includes a plurality of connector first surface connection contacts, and
the first interposer is coupled with the connector by connection between the plurality of first interposer second surface connection contacts and the plurality of connector first surface connection contacts.

6. The apparatus of claim 5, wherein:
the second interposer second surface includes a plurality of second interposer second surface connection contacts,
the connector second surface includes a plurality of connector second surface connection contacts, and
the second interposer is coupled with the connector by connection between the plurality of second interposer second surface connection contacts and the plurality of connector second surface connection contacts.

7. The apparatus of claim 3, wherein:
the first memory module second surface includes a plurality of first memory module second surface test contacts to be used to test the first memory module memory die.

8. The apparatus of claim 7, wherein the first memory module second surface includes fewer contacts than the first memory module first surface.

9. The apparatus of claim 7, wherein:
the second memory module second surface includes a plurality of second memory module second surface test contacts to be used to test the second memory module memory die.

10. The apparatus of claim 9, wherein the second memory module second surface has fewer contacts than the second memory module first surface.

11. The apparatus of claim 3, wherein the first memory module includes:
a first memory module second surface memory die mounted on the first memory module second surface, and
a plurality of first memory module traces and a plurality of first memory module vias to connect the first memory module second surface memory die to the first memory module first surface connection contacts.

12. The apparatus of claim 4, wherein the second memory module includes:
a second memory module second surface memory die mounted on the second memory module second surface, and
a plurality of second memory module traces and a plurality of second memory module vias to connect the second memory module second surface memory die to the second memory module first surface connection contacts.

13. The apparatus of claim 6, wherein:
the connector first surface includes a plurality of connector first surface computer system connection contacts, a plurality of connector traces, and a plurality of connector vias, and the plurality of connector traces and the plurality of connector vias to connect the plurality of connector first surface connection contacts to the plurality of connector first surface computer system connection contacts.

14. The apparatus of claim 13, wherein:
the connector second surface includes a plurality of connector second surface computer system connection contacts, and
the plurality of connector traces and the plurality of connector vias to connect the plurality of connector second surface connection contacts to the plurality of connector first surface computer system connection contacts.

15. A system comprising:
a rack to house and interconnect computation resources;
a processor device coupled to the rack; and
a memory device coupled to the rack, the memory device including:
    a first memory module having a at least one first memory module memory chip,
    a second memory module having a at least one second memory module memory chip,
    a first interposer coupled and bonded with the first memory module,
    a second interposer coupled and bonded with the second memory module, and
    a connector:
        coupled and bonded with the first interposer on a connector first surface,
        coupled and bonded with the second interposer on a connector second surface, wherein the connector first surface is on the opposite side of the connector second surface.

16. The system of claim 15, wherein:
the first memory module has a first memory module first surface and a first memory module second surface, wherein the first memory module first surface is on the opposite side of the first memory module second surface,
the second memory module has a second memory module first surface and a second memory module second surface, wherein the second memory module first surface is on the opposite side of the second memory module second surface,
the first interposer has a first interposer first surface and a first interposer second surface, wherein the first interposer first surface is on the opposite side of the first interposer second surface,
the second interposer has a second interposer first surface and a second interposer second surface, wherein the second interposer first surface is on the opposite side of the second interposer second surface,
the first memory module first surface is connected and bonded to the first interposer first surface,
the second memory module first surface is connected and bonded to the second interposer first surface,
the first interposer second surface is connected and bonded to the connector first surface, and,
the second interposer second surface is connected and bonded to the connector second surface.

17. The system of claim 16, wherein:
the first memory module first surface includes a plurality of first memory module first surface connection contacts,
the first interposer first surface includes a plurality of first interposer first surface connection contacts,
the first memory module is coupled with the first interposer by connection between the plurality of first memory module first surface connection contacts and the plurality of first interposer first surface connection contacts,
the second memory module first surface includes a plurality of second memory module first surface connection contacts,
the second interposer first surface includes a plurality of second interposer first surface connection contacts, and
the second memory module is coupled with the second interposer by connection between the plurality of second memory module first surface connection contacts and the plurality of second interposer first surface connection contacts.

18. The system of claim 16, wherein:
the first interposer second surface includes a plurality of first interposer second surface connection contacts,
the connector first surface includes a plurality of connector first surface connection contacts,
the first interposer is coupled with the connector by connection between the plurality of first interposer second surface connection contacts and the plurality of connector first surface connection contacts,
the second interposer second surface includes a plurality of second interposer second surface connection contacts,
the connector second surface includes a plurality of connector second surface connection contacts, and
the second interposer is coupled with the connector by connection between the plurality of second interposer second surface connection contacts and the plurality of connector second surface connection contacts.

19. The system of claim 17, wherein:
the first memory module second surface includes a plurality of first memory module second surface test contacts to be used to test the at least one first memory module memory chip, wherein the first memory module second surface includes fewer contacts than the first memory module first surface, and
the second memory module second surface includes a plurality of second memory module second surface test contacts to be used to test the at least one second memory module memory chip, wherein the second memory module second surface has fewer contacts than the second memory module first surface.

20. The system of claim 18, wherein:
the connector includes a plurality of connector traces, and a plurality of connector vias,
the connector first surface includes a plurality of connector first surface computer system connection contacts,
the connector second surface includes a plurality of connector second surface computer system connection contacts,
the plurality of connector traces and the plurality of connector vias to connect the plurality of connector first surface connection contacts to the plurality of connector first surface computer system connection contacts, and
the plurality of connector traces and the plurality of connector vias to connect the plurality of connector second surface connection contacts to the plurality of connector first surface computer system connection contacts.

* * * * *